United States Patent [19]
Webb

[11] 4,124,187
[45] Nov. 7, 1978

[54] SUPPORT STRUCTURE FOR A CABINET
[75] Inventor: William M. Webb, Louisville, Ky.
[73] Assignee: General Electric Company, Louisville, Ky.
[21] Appl. No.: 781,848
[22] Filed: Mar. 28, 1977
[51] Int. Cl.² .................................... F16M 11/24
[52] U.S. Cl. ............................................ 248/188.3
[58] Field of Search ............... 248/23, 188.2, 188.3, 248/446; 312/249, 253

[56] References Cited
U.S. PATENT DOCUMENTS

| | | | |
|---|---|---|---|
| 467,811 | 1/1892 | Humphreys | 248/188.3 |
| 676,749 | 6/1901 | Hazlewood | 248/446 |
| 2,540,750 | 2/1951 | Morrison | 248/23 UX |
| 2,695,147 | 11/1954 | Castricone | 248/188.3 X |
| 3,222,021 | 12/1965 | Sisler | 248/188.3 |
| 3,304,032 | 2/1967 | Yates | 248/188.3 X |
| 3,534,978 | 10/1970 | Stanfield | 248/188.2 X |
| 3,880,388 | 4/1975 | Beguin | 248/188.3 |
| 3,954,241 | 5/1976 | Carlson | 248/188.3 |
| 3,991,962 | 11/1976 | Kovats | 248/188.3 X |

FOREIGN PATENT DOCUMENTS

| | | | |
|---|---|---|---|
| 18,389 | 11/1904 | Austria | 248/23 |
| 496,437 | 2/1976 | U.S.S.R. | 248/188.3 |

Primary Examiner—Lawrence J. Staab

[57] ABSTRACT

A rear support structure for a cabinet is disclosed. The support structure includes provision for automatically adjusting the level of the rear of a cabinet to compensate for a supporting surface which slopes from side to side. The support structure comprises a shaft mounted to the rear, underside of the cabinet and extending transversely of the cabinet. Levelling elements associated with each end of the shaft are rotatable with respect to the axis of the shaft. The levelling elements are formed so that rotation of one of the elements, upon engagement with the supporting surface, will reduce the distance between the underside of the cabinet and the supporting surface and will cause the other element to rotate in a direction to increase the distance between the underside of the cabinet and the supporting surface.

14 Claims, 12 Drawing Figures

SUPPORT STRUCTURE FOR A CABINET

BACKGROUND OF THE INVENTION

1. Field of the Invention

This invention relates to support structures for cabinets and, more particularly, to such structures for uniformly supporting cabinets, such as refrigerator cabinets, on surfaces which slope from side to side.

2. Description of the Prior Art

Frequently, appliances such as washing machines and refrigerators, are placed on sloping surfaces. Usually, manually adjustable supports are affixed to the front underside of the cabinets of the appliances. These supports are individually adjustable so that they can be employed for compensating for slope in a supporting surface from front to back and also for slope from side to side. The front supports, usually two in number, must often be adjusted to unequal lengths to compensate for the side-to-side slope in the supporting surface. Where the cabinet has two fixed rear supports, the cabinet may then rock on three of its four supports. In the case of an appliance such as a washing machine, this may result in undesirable "walking." Of potentially greater concern, the weight of the cabinet may cause twisting of the cabinet to bring all four supports into engagement with the supporting surface. This is particularly of concern in a refrigerator cabinet for it is very heavy when a normal amount of food is stored therein. Because a refrigerator cabinet is tall and not as rigid as more compact cabinets it has a greater tendency to twist when not supported on all of the supporting elements. This twisting action of the cabinet may cause distortion of the front face of the cabinet against which the door closes and thereby prevent the door from properly sealing its gasket with respect to this front face of the cabinet. Without proper sealing, heat will leak into the refrigerator's cooling compartment and result in inefficient refrigeration and waste of electrical energy. Moreover, in the case of refrigerator-freezers which have two doors, either one above the other or side by side, this twisting may prevent the doors from lining up well enough to be aesthetically acceptable.

Since the above-mentioned appliances are heavy and are often placed in confined areas, it is difficult or impossible to provide access to the rear supports for adjusting such supports to compensate for a sloping surface, particularly one which slopes from side to side. Hence, it is important to provide a means for effecting automatic adjustment of a rear support of the cabinet of the appliance to conform to the adjustment of the front supports in order that the cabinet may be uniformly supported, front and back, in an upright position, and to do this without requiring access to the rear supports.

The problem of providing self-adjusting supports for facilitating the levelling of appliances such as refrigerators and washing machines when such appliances are positioned on sloping floor surfaces is well-known, and the prior art discloses many examples of self-adjusting assemblies adapted especially for facilitating the levelling of such appliances without requiring access to the rear support structure and without requiring the use of manual procedures or tools. For example, U.S. Pat. No. 3,954,241 teaches a self-adjusting assembly especially adapted for facilitating the levelling of an appliance, such as a washing machine or the like, on a sloping floor in order that the appliance be firmly positioned thereon. The assembly includes a pair of brackets located at the two rearmost, lower corners of an appliance, and a flexible cable element extending from one bracket to the other. Each bracket is provided with an independently adjustable leg member, with the members being interconnected by the cable. If both rear legs do not engage the floor, the leg which first engages the floor is forced upwardly by the weight of the cabinet. Through the cable, this causes a corresponding downward movement of the other leg until it is brought into engagement with the floor.

Another example of a support with automatic adjustment is taught by U.S. Pat. No. 3,880,388. The support is of the leg-type, comprising two vertically movable legs coupled together, in one embodiment, by a chain of rigid thrust elements encased by a tubular guide. These elements are arranged such that as the weight of the supported structure causes one leg, which engages the surface upon which the structure is placed, to move upwardly, the other leg is urged downwardly until it engages the surface.

Still another example of a support with automatic adjustment is taught by the U.S. Pat. No. 2,695,147. The support includes a pair of cams at the rearmost corners of an appliance, which cams are connected together by a connecting rod. The cams are shaped to slope in opposite directions and are arranged for rotation about vertical axes. The cams are rotatably connected to plungers which support the cams, the plungers forming feet or legs which actually support the appliance on a floor or other surface. If greater pressure is applied to one of the plungers than is applied to the other, the cam in engagement with the plunger having the greater pressure applied thereto tends to rotate about a vertical axis so as to shorten that plunger relative to the base of the appliance. This rotation is transmitted through the connecting rod to the other cam and causes rotation of this other cam in a corresponding direction, but, because of the opposite slope of the cams, this tends to lengthen the plunger connected thereto relative to the base. This produces an equalizing action that automatically provides uniform support for the appliance on the supporting surface.

One problem with such prior art self-adjusting leg-type support is that the mechanisms employed are of expensive and complex construction due to the use of many parts and to the functional relationships of these parts.

In lieu of leg-type supports, some prior art cabinet structures employ a single, rear roller-type support in combination with two adjustable front supports. If a single roller-type support is utilized, it is necessary to provide a roller of reasonable length to assure adequate stability of the rear portion of a cabinet. This is especially important where the supporting surface is a soft floor covering. If the weight of the rear portion of the cabinet is supported on a short roller, this may result in a substantial depression in the supporting surface. Such depression, aside from marring the appearance of the floor covering, would hinder the moving of the appliance from the confined space. However, where the two front supports are adjusted to unequal lengths on a floor which slopes from side to side and a roller of adequate length is employed, another problem is encountered in that one end of the rear roller may engage the floor covering and tend to press into the soft floor covering. A related invention of William M. Webb is directed to this particular problem and is the subject of copending application Ser. No. 756,236, filed Jan. 3, 1977.

Some prior art cabinet structures, for example, that shown in U.S. Pat. No. 3,222,021 employ a mechanism comprising two oppositely sloped ramps in lieu of leg-type supports. The ramps are formed at the two rear corners of a cabinet and the cabinet is supported on these ramps in such a manner that a slight sideward movement of the cabinet results in one rear corner sliding up one ramp and the other rear corner sliding the same distance down the opposite ramp. The ramp construction provides substantial resistance to movement at the rear corners. This ramp-type support is frequently utilized with washing machines because washing machines usually shake while spin drying, and the friction of the ramp is quite helpful in preventing unwanted rocking while being easily overcome for automatic adjustment during a spin cycle. However, since refrigerators shake very little and since refrigerator cabinets are tall and not as rigid as more compact cabinets, such as washing machine cabinets, and, therefore, have a greater tendency to twist, the rear support should be able to adjust with very little frictional resistance. Hence, the ramp-type support, with its substantial friction, is not particularly useful in supporting refrigerator cabinets on surfaces which slope from side to side.

By this invention, these disadvantages and limitations of the prior art are overcome, and a support for cabinets, such as refrigerators and washing machines, is provided which is simple in construction, which can be manufactured economically and which readily and automatically adjusts itself for uniformly supporting the cabinet on a surface which slopes from side to side.

Accordingly, it is an object of this invention to provide an improved construction of a rear support structure for a cabinet which automatically adjusts itself to a supporting surface sloping from side to side.

It is another object of this invention to provide such a rear support structure which proportionately distributes the weight of the rear of the cabinet to insure that all four corners of the cabinet will be uniformly supported on the supporting surface to prevent any rocking or twisting.

It is still a further object of this invention to provide a rear support structure which minimizes depressions in a supporting surface and thereby facilitates the moving of an appliance such as a refrigerator cabinet from a confined space.

SUMMARY OF THE INVENTION

This invention is directed to a self-adjusting, rear support structure for a cabinet for uniformly supporting the cabinet on a supporting surface which slopes from side to side. The support structure includes a shaft mounted to the rear, underside of the cabinet and extending transversely of the cabinet in a generally horizontal position. Levelling elements associated with each end of the shaft are rotatable about the horizontal axis of the shaft. The levelling elements are formed so that rotation of one of the elements to reduce the distance between the underside of the cabinet and the supporting surface automatically causes the other element to rotate in a direction to increase the distance between the underside of the cabinet and the supporting surface. In a preferred embodiment, the levelling elements include cam portions which are integral with or mounted on the shaft and engage the floor. If, initially only one such cam portion engages the supporting surface, this engagement causes rotation of that cam portion and of the shaft to bring both cam portions into engagement with the supporting surface. In another embodiment, the cam portions do not directly engage the floor but are arranged to engage assemblies including rollers which in turn engage the floor to support the refrigerator cabinet.

DESCRIPTION OF THE PREFERRED EMBODIMENT

Figure 1:
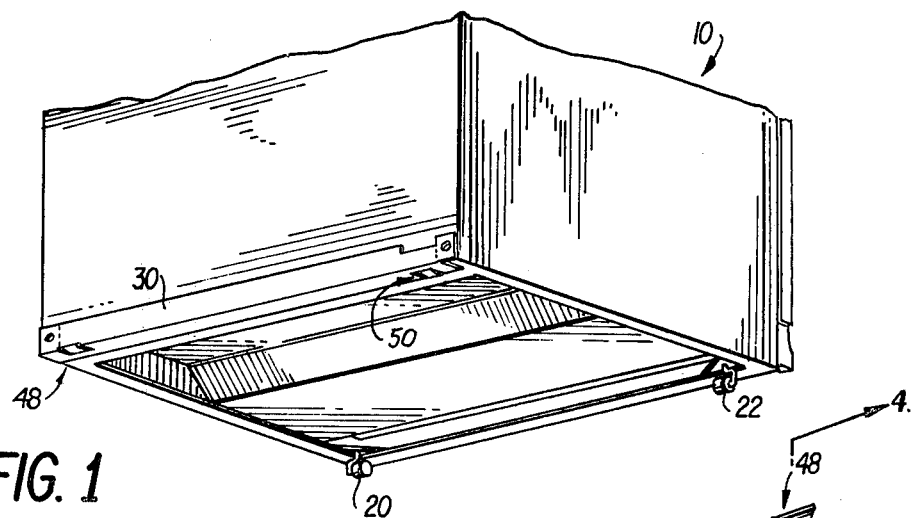
FIG. 1 is a perspective view of the underside of a refrigerator cabinet incorporating the support structure of this invention, as seen from a rear corner.

Referring to the drawings, there is shown in FIG. 1, a portion of a refrigerator cabinet 10. At the front lower corners of the cabinet 10 are disposed a pair of independently adjustable threaded supports or rollers 20 and 22 for adjusting the front of the cabinet to compensate for slope of the floor or other supporting surface 25 (shown in FIGS. 3 and 4). The adjustable rollers 20 and 22 may be of conventional type and have not been shown in detail because they do not form part of the present invention.

Insofar as the front of the refrigerator is concerned, the independently adjustable supports 20 and 22 can be employed to compensate for the slope of the floor 25 both in a back-to-front direction and in a side-to-side direction. Thus, if the floor should slope from back to front of the cabinet, for example, it is merely necessary to adjust both supports 20 and 22 by equal amounts until the cabinet is level. If the floor slopes to the left, then the left (as viewed from the front of the cabinet) front support 22 is adjusted to a greater length than the right front support 20 to compensate for the slope of the floor and thereby support the front of the cabinet in a level position. However, in the usual case, the cabinet, such as a refrigerator or washing machine, is placed in a confined space where access to the rear of the cabinet is difficult or impossible. It is therefore unsatisfactory to use manually adjustable supports at the rear of the cabinet because of the difficulty or impossibility of obtaining access to such rear supports. If, on the other hand, two fixed supports are employed at the rear corners, it will be appreciated that on a floor which slopes from side to side the cabinet will tend to rock on three of the four supports. Alternatively, the cabinet may tend to distort or twist in order to bring all four supports into engagement with the floor. This is particularly so in the case of relatively tall appliances such as refrigerators and significant distortion or twisting of the refrigerator cabinet may result in unsatisfactory sealing of the refrigerator doors.

In the present invention, the rear support structure is formed in a manner which overcomes all of these problems. This is done by providing, in the embodiment shown in FIGS. 2, 3 and 4, a support structure 30 which includes provision whereby the support structure automatically adjusts itself so as to engage the floor regardless of the slope of the floor.

Figure 2:
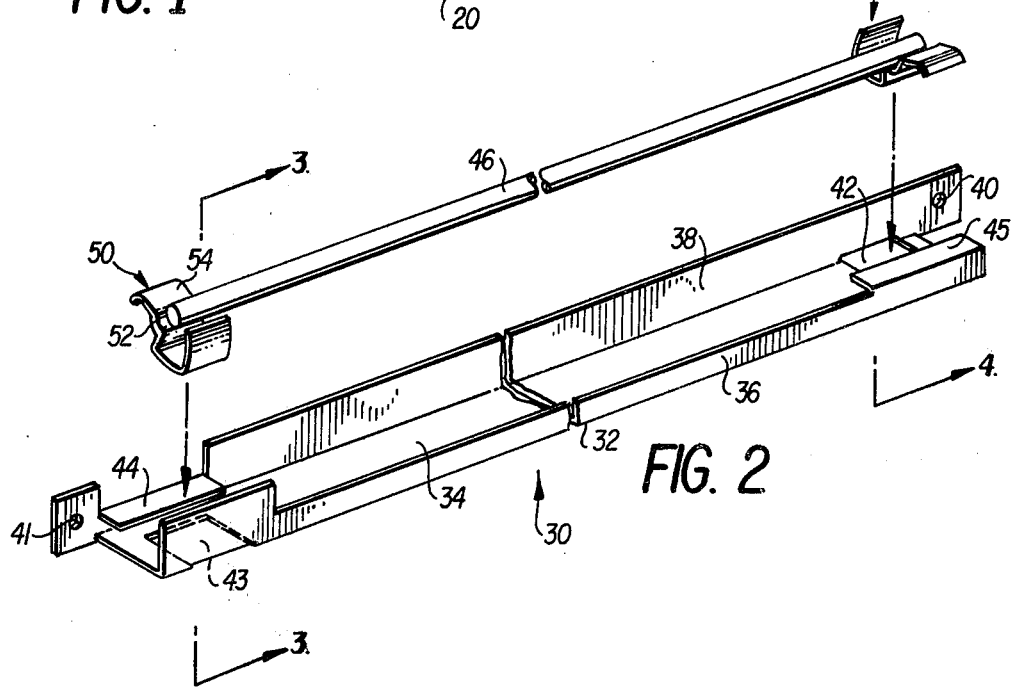
FIG. 2 is an exploded view of one preferred embodiment of the invention.
Figures 3, 4:
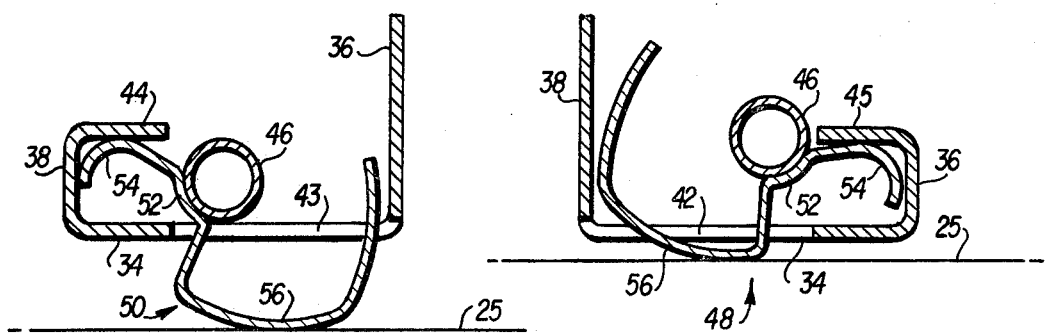
FIG. 3 is a view, on a larger scale, taken along the line 3—3 in FIG. 2.
FIG. 4 is a view, on a larger scale, taken along the line 4—4 in FIG. 2.

Referring to FIGS. 2, 3 and 4, the rear support structure 30 comprises a mounting means or channel 32 which extends transversely of the cabinet 10 and is affixed to the rear, underside of the cabinet. The channel 32 comprises a bottom wall 34 and side walls 36 and 38. Side wall 38 has apertures 40 and 41 at its right and left ends, respectively. Bolts or other suitable means are inserted in the apertures 40 and 41 to affix channel 32 to the rear of the cabinet. In the bottom wall 34 of the channel 32, adjacent the right and left ends thereof, are rectangular apertures 42 and 43, respectively, for receiving therethrough levelling elements which support the rear of the cabinet 10 on a supporting surface. The channel 32 is formed at the left end of the side wall 38 to provide a levelling element retaining means 44 extending forwardly from the side wall 38 of the channel 32 parallel to the bottom wall 34 for retaining a levelling element in assembled position in the channel 32. At its right end the channel 32 is similarly formed to provide a corresponding retaining means 45 extending rearwardly from side wall 36 of the channel 32 and parallel to the bottom wall 34 for retaining the other levelling element in assembled position in the channel 32.

Positioned in the channel 32 is a hollow shaft 46 to which levelling elements 48 and 50 are affixed at the right and left ends thereof, respectively, as viewed in FIG 2. As best shown in FIG. 3, the levelling element 50 includes a central portion 52 which is arcuate in shape to conform to the exterior surface of the shaft 46 so that the levelling element 50 may be securely connected, as by brazing or welding, to the shaft 46. Levelling element 50 includes a second portion 54 which is curved into the space between the retaining means 44 and the bottom wall 34 of the channel 32 and bears against the lower surface of retaining means 44. The positioning of this second portion between the retaining means 44 and the bottom wall 34 serves to retain the levelling element 50 and the left end of the shaft 46 in position in the channel 32 and at the same time permits rotation of the shaft and the levelling element and upward and downward movement of the shaft and levelling element relative to the cabinet for effecting automatic adjustment of the height. Finally, the levelling element 50 includes a third or cam portion 56 adapted to engage the floor or other supporting surface upon which the cabinet 10 is mounted.

As shown in FIG. 4, the levelling element 48 which is disposed at the right end of the supporting structure similarly includes an arcuate portion 52 for fastening the levelling element to the right end of the shaft 46, a second portion 54 disposed between the retaining means 45 and the bottom wall 34 of the channel 32 and a third portion 56 shaped to provide a cam portion for engaging the floor or other supporting surface 25. However, the levelling element 48 is angularly displaced on the shaft with respect to levelling element 50. More specifically, the levelling element 48 is mounted on the shaft 46 so as to extend in an opposite direction relative to the shaft 46 from the levelling element 50. Thus, while the second portion 54 of the levelling element 50 extends rearwardly and the third portion 56 extends forwardly, the second portion 54 of the levelling element 48 extends forwardly and the third portion 56 extends rearwardly.

When the cabinet 10 is placed upon a floor or supporting surface which slopes from side to side, the front supports 20 and 22 are manually adjusted to compensate for the side-to-side slope of the supporting surface. As the front supports are adjusted to insure that the front of the cabinet 10 is firmly and stably supported in a level position on the sloping surface, the rear support structure 30 automatically adjusts itself such that both levelling elements 48 and 50 also engage the supporting surface. Assuming that the floor slopes to the left and therefore that levelling element 48 is the first to engage the floor or supporting surface 25 at the relatively higher portion thereof, the weight of the cabinet causes the levelling element 48 to rotate in a clockwise direction as viewed in FIG. 4. Rotation of the levelling element 48 causes the curved surface of the second portion 54 of the levelling element 48 to ride on the lower surface of the retaining means 45 as levelling element 48 moves to the position shown in FIG. 4. Since the portion of the floor 25 upon which levelling element 48 is disposed is higher in elevation than that portion of the floor upon which levelling element 50 is disposed, levelling element 48 initially engages the supporting surface 25. The weight of the cabinet urging the third or cam portion 56 of levelling element 48 against the floor 25 causes the levelling element 48 and the shaft 46 to rotate in a clockwise direction as viewed in FIG. 4, thereby effectively lowering the right rear corner of the cabinet relative to the supporting surface 25. Rotation of the shaft 46 in turn causes corresponding rotation of levelling element 50 which is affixed to the shaft 46 in a position which is the reverse of the position which levelling element 48 occupies with respect to shaft 46. Therefore, clockwise rotation of levelling element 50 causes the third or cam portion 56 of the levelling element 50 to move downwardly to the position shown in FIG. 3 and thereby effectively raise the left rear corner of the cabinet relative to the supporting surface 25. It can be seen from FIGS. 3 and 4 that the shaft 46 is free to move upwardly at one end and downwardly at the other end as the automatic levelling is accomplished.

Thus, when only one of the levelling elements initially engages the supporting surface because of the side-to-side slope of the supporting surface, this levelling element is caused to rotate and thereby to cause the shaft and the other levelling element to rotate in a manner which brings both the levelling elements into engagement with the supporting surface. Thereby, all four corners of the cabinet are uniformly supported on the floor, and the weight of the cabinet is thereby distributed substantially equally on each of the four supports to prevent any rocking or twisting. It should be noted that the maximum side-to-side slope normally encountered will require an upward or downward movement of the levelling elements of only ⅛ to ⅜ inch in order to accomplish the levelling of the cabinet.

Figure 5:
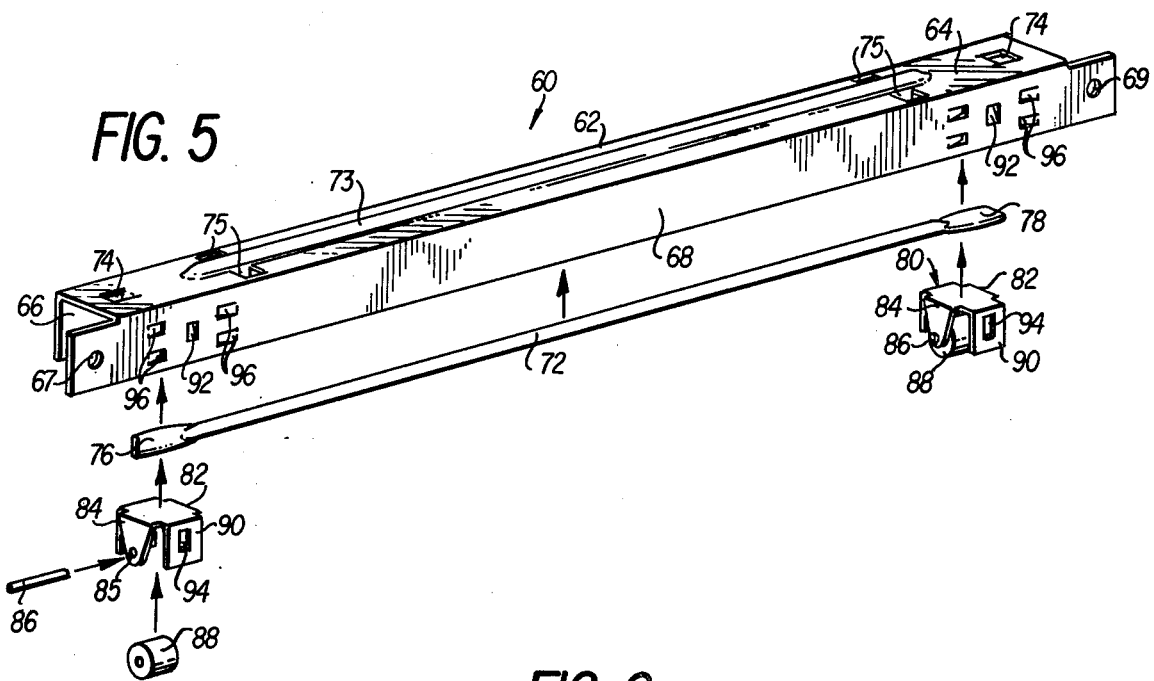
FIG. 5 is an exploded view showing another embodiment of the support structure according to the invention.
Figure 6:
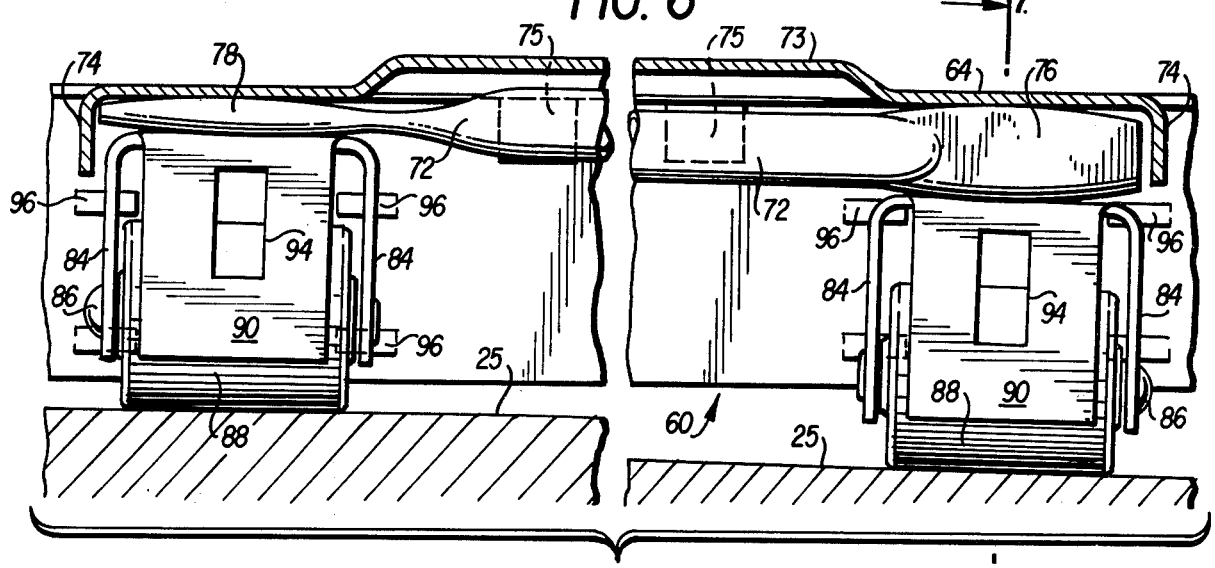
FIG. 6 is an elevational view, partly broken away, of a portion of the embodiment shown in FIG. 5 with the cabinet supported on a sloping surface.
Figure 7:
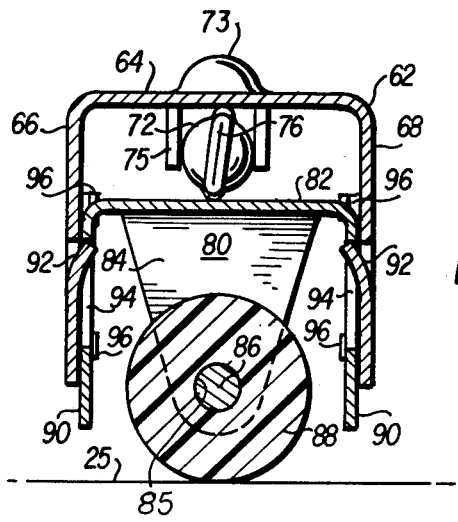
FIG. 7 is a sectional view taken along the line 7—7 in FIG. 6.

While the particular configuration of the support structure shown in FIGS. 2, 3 and 4 is preferred, other configurations may be utilized to accomplish the levelling of a cabinet, such as a refrigerator, on a supporting surface which slopes from side to side. One such modification is shown in FIGS. 5, 6 and 7. This modification differs from that previously described primarily in that the cam portions of the levelling elements do not directly engage the supporting surface but rather are caused to effect movement of rollers which in turn engage the supporting surface.

Referring now to FIGS. 5, 6 and 7, there is shown a support structure 60 which includes a mounting means or channel 62 for mounting levelling elements on the cabinet. Channel 62 includes a top wall 64 and side walls 66 and 68. Viewed from the rear of the cabinet, side wall 68 has apertures 67 and 69 near the left and right ends, respectively. Bolts or other fastening elements are received in these apertures for fastening the channel 62 to the cabinet. A shaft 72 is disposed in the channel 62. To provide clearance for the shaft a protrusion 73 is formed in the top wall 64 of the channel. In order to limit axial translation of the shaft 72 the top wall 64 of the channel is formed to include near the ends of the shaft downwardly extending flanges 74. To limit movement of the shaft transversely of the channel the top wall 64 is also formed to include a plurality of pairs of downwardly extending ears 75. The pairs of ears are spaced longitudinally along the channel. As best shown in FIG. 7 each pair of ears are spaced to confine the shaft 72 therebetween. The shaft 72 is formed from a tubular member and the left and right ends are flattened as shown at 76 and 78, respectively, to form cam portions. The planes of the cam portions 76 and 78 are angularly displaced with respect to each other, preferably perpendicularly.

Positioned within the channel 62 near the opposite ends thereof are roller assemblies 80. Each of the roller assemblies is positioned in line with a corresponding one of the cam portions 76 or 78 disposed at opposite ends of the shaft 72. Each roller assembly 80, as shown in greatest detail in FIG. 7, comprises a top plate 82 positioned to be engaged by a corresponding cam portion and a pair of spaced ears 84 extending downwardly from the top plate. The ears 84 include aligned openings 85 in the lower ends thereof for receiving a pin 86. A roller 88 is mounted on the pin 86 and positioned for engaging the floor or other supporting surface 25.

For slidably mounting the roller assemblies for upward and downward movement within the channel 62, each roller assembly further includes two downwardly extending legs 90, these legs being arranged in planes perpendicular to the planes of the ears 84. The legs 90 of the roller assembly are positioned adjacent the side walls 66, 68 of the channel 62. The side walls 66, 68 are formed to include inwardly extending tabs 92 and each of the legs 90 includes an aperture 94 into which the corresponding tab 92 extends for limiting the downward vertical movement of the roller assembly 80. In order to maintain each of the roller assemblies in line with the corresponding cam portion of the shaft 72, a plurality of tabs 96 are formed extending inwardly from the side walls of the channel 62. A pair of such tabs 96 is positioned generally adjacent each side of each downwardly extending leg 90 so that legs 90 are confined for vertical sliding movement between pairs of tabs 96.

The embodiment shown in FIGS. 5, 6 and 7 operates in a similar manner to the previously-described embodiment to effect automatic levelling of the rear portion of the cabinet. Thus, assuming, as shown in FIG. 6, that the supporting surface or floor 25 slopes downwardly from left to right, the lefthand roller, as viewed in FIG. 6, will first be caused to come into engagement with the floor 25. The weight of the cabinet exerted on this roller causes the roller and the associated roller assembly 80 to be urged upwardly, urging the plate 82 against the cam portion 78 at the left end of the shaft 72. This causes rotation of the shaft and corresponding rotation of the cam portion 76 at the right end of the shaft 73. Because the right and left cam portions 76 and 78, respectively, are arranged at a 90° angle relative to each other, as the cam portion 78 is urged toward a horizontal position by the roller assemby 80, the cam portion 76 at the opposite end of the shaft is caused to be moved toward a vertical position. The cam portion 76, as it turns, engages the plate 82 of the righthand roller assembly 80, thereby urging that roller assembly downwardly until the roller 88 is brought into engagement with the floor 25. Thus, the levelling elements of the support structure at the rear of the cabinet in this embodiment automatically adjust for the side-to-side slope of the floor and cause the weight of the cabinet to be equally distributed between the two rear supporting members in the same general manner as the automatic levelling of the rear support structure is accomplished in the embodiment previously described.

Figure 8:
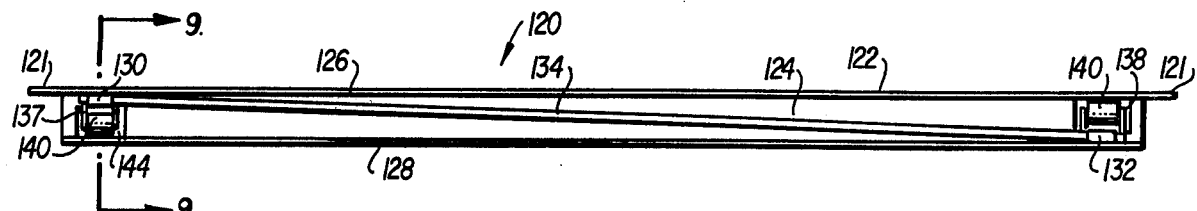
FIG. 8 is a top view of still another embodiment of the support structure according to the invention.
Figure 9:
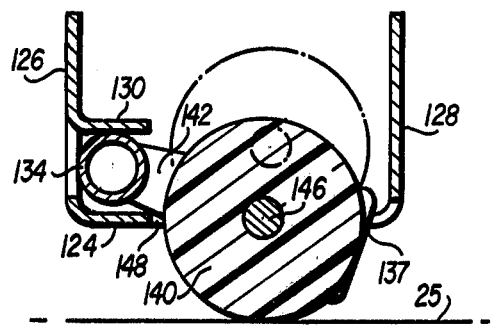
FIG. 9 is a sectional view, on a larger scale, taken along lines 9—9 in FIG. 8.
Figure 10:
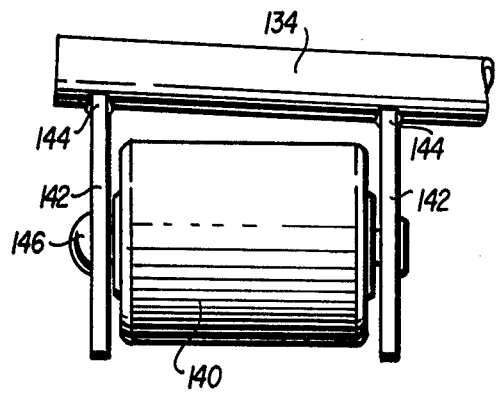
FIG. 10 is a top view of a portion of the support structure shown in FIG. 9, with the inclination of the shaft somewhat exaggerated.

FIGS. 8, 9 and 10 illustrate still another embodiment of the invention. This embodiment includes a support structure 120 which is mounted at the rear of the cabinet in any suitable manner, as by fastening means extending through apertures in flanges 121 at the ends of the support structure. The support structure includes a channel 122 having a bottom wall 124 and side walls 126 and 128. Side wall 126 is formed to include, near the left end, an inwardly extending flange 130 disposed a short distance above the bottom wall 124. Correspondingly, at the other end of the channel 122 the side wall 128 is formed to include an inwardly extending flange 132 disposed a short distance above the bottom wall 124. A hollow shaft 134 is disposed in the channel and extends diagonally in the channel. One end of the shaft is disposed between the flange 130 and the bottom 124 of the channel 122 adjacent the side wall 126. The other end of the shaft is disposed between the flange 132 and the bottom of the channel adjacent the other side wall 128.

Disposed on the shaft 134 at opposite ends thereof are levelling elements, indicated generally by the numerals 137, 138, which are utilized to support the cabinet on a sloping surface. The levelling element 137, as shown in detail in FIGS. 9 and 10, includes a roller 140. The roller is mounted on the shaft 134 by means of two spaced brackets 142. The brackets are secured to the shaft in any suitable manner, as by welds indicated at 144. The brackets include spaced aligned opening for receiving a pin 146 on which the roller 140 is supported. To permit movement of the roller 140 into engagement with the supporting surface or floor 25, an opening 148 is provided in the bottom wall 124 of the channel 122 in line with the roller. The construction of the levelling element 138 is identical with that of the levelling element 137 just described except that it is mounted on the opposite side of the shaft 134 and faces in the opposite direction. More specifically, referring to FIG. 8, the shaft at the left end thereof is positioned at the rear of the channel 122, the brackets 142 extend toward the front of the channel and the roller 140 is disposed at the front of the channel. Conversely, the shaft at the right end is disposed at the front of the channel 122, the brackets 142 extend toward the rear of the channel and the roller 140 is disposed at the rear of the channel.

Referring now to FIG. 9 in particular, and assuming that the floor 25 slopes from left to right, the roller 140 at the left end is first brought into engagement with the floor 25. The weight of the cabinet causes counterclockwise pivoting, as viewed in FIG. 9, of the levelling element 137 from the solid line position toward the dotted line position. The levelling element 137 pivots about the axis of the shaft 134 which is confined between the bottom 124 of the channel 122 and the flange 130. This causes counterclockwise movement of the shaft, as viewed in FIG. 9, and corresponding movement of the levelling element 138 at the other end of the shaft. Because, as indicated previously, the levelling element 138 is positioned oppositely from levelling element 137 the rotation of the shaft corresponding to the upward movement of the roller 140 at the left end of the shaft causes a corresponding downward movement of the roller 140 at the right end, bringing that roller into engagement with the floor 25 and thereby causing the weight of the rear of the cabinet to be distributed equally on the two rollers.

Figure 11:
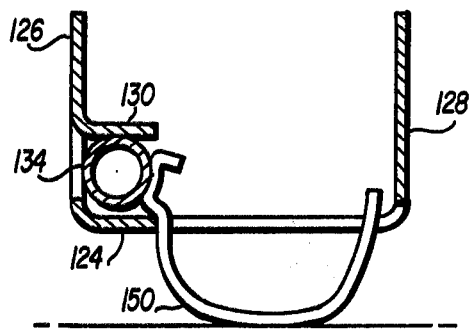
FIG. 11 is an end view of another embodiment of the support structure, similar to that shown in FIGS. 8–10.
Figure 12:
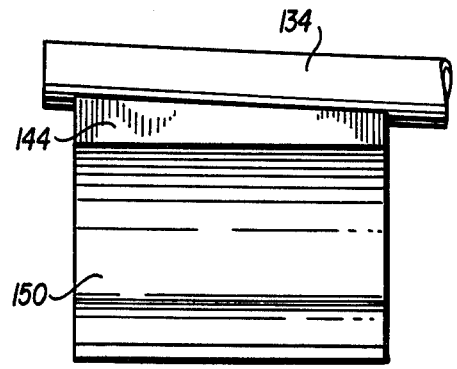
FIG. 12 is a top view of a portion of the support structure shown in FIG. 11.

FIGS. 11 and 12 illustrate still another embodiment of the invention. This embodiment differs from that shown in FIGS. 8, 9 and 10 primarily in that the rollers have been omitted and a supporting member 150, connected directly to the shaft 124, has been substituted for each roller. The channel 124 is constructed identically with that shown in FIGS. 8 and 9 and the same numerals have been employed to designate corresponding parts in FIGS. 11 and 12. The supporting members 150 in the embodiment shown in FIGS. 11 and 12 perform the same levelling functions as the roller in the embodiment of FIGS. 8, 9 and 10 and in the same manner to effect automatic levelling of the rear of the cabinet to compensate for side-to-side slope of the floor or other supporting surface. This configuration is particularly suitable in those instances where the cabinet is expected to remain in a fixed position after the initial adjustment has been made, and where rollers for facilitating movement of the cabinet are therefore unnecessary. In this case adjustable gliders rather than rollers could be employed at the front of the cabinet.

By providing the cabinet with any one of the structures of this invention, the rear of the cabinet is automatically supported in a level position in a manner which insures proper weight distribution of the rear of the cabinet on the rear supports. Thus, the cabinet is stably positioned and not susceptible to twisting or rocking. Moreover, because of the uniform distribution of the weight of the rear of the cabinet, the possibility of depressions in the supporting surface which could be caused by a disproportionate distribution of the weight of the cabinet on the rear support is minimized. Hence, the cabinet can be more readily moved, especially from a confined space.

While particular rear cabinet support structures have been shown and described, other modifications will occur to those skilled in the art. It is intended, therefore, that the invention not be limited to the particular embodiments shown and described and that the appended claims should cover such modifications as fall within the spirit and scope thereof.

What is claimed is:

1. A structure for supporting a cabinet on a supporting surface comprising:
   (a) a rotatable shaft extending transversely of the cabinet at the rear thereof;
   (b) a rotatable leveling element at each end of said shaft, rigidly attached to said shaft, one leveling element extends rearwardly from the shaft and the other leveling element extends forwardly from the shaft;
   (c) means for mounting said shaft to the cabinet for rotation about a substantially horizontal axis comprising a channel secured to the cabinet, said channel having a bottom wall and two spaced side walls extending upwardly from the bottom wall disposed therebetween, the channel also includes at each end an inwardly extending flange spaced from the bottom wall, said shaft being disposed at each end between the bottom wall and a corresponding one of the flanges for retaining the shaft in position in the channel; and
   (d) said leveling element being arranged so that rotation of one of said leveling elements, upon engagement with the supporting surface, in a direction to reduce the distance between the underside of said cabinet and the supporting surface, causes corresponding rotation of said shaft and of the other of said elements, said rotation of the other of said elements increasing the distance between the underside of the cabinet and the supporting surface, whereby when only one of said elements initially engages the supporting surface, rotation of the other element is effected to bring both elements into engagement with the supporting surface.

2. The support structure of claim 1, wherein said levelling element on said shaft at one end thereof is angularly displaced from said levelling element on said shaft at the other end thereof.

3. The support structure of claim 1, wherein said levelling element on said shaft includes a roller for engaging the supporting surface.

4. The supporting structure of claim 1, wherein:
   (a) said flange at one end of said channel extends inwardly from one of said side walls and said flange at the other end of said channel extends inwardly from the other of said side walls; and
   (b) said shaft extends diagonally in said channel.

5. The support structure of claim 1, wherein each of said levelling elements includes a cam portion arranged to engage the supporting surface.

6. The supporting structure of claim 5, wherein said bottom wall of said channel includes an aperture at each end in line with the corresponding cam portion.

7. The support structure of claim 5, wherein:
   (a) said channel includes a bottom wall and spaced side walls extending upwardly therefrom;
   (b) said channel further includes at one end thereof a first flange extending inwardly from one of said side walls and spaced from said bottom wall;
   (c) said channel further includes at the other end thereof a second flange extending inwardly from the other of said side walls and spaced from said bottom wall; and
   (d) each of said levelling elements includes a portion disposed in the space between the corresponding flange and said bottom wall for limiting vertical movement of said levelling element.

8. A structure for supporting a cabinet on a supporting surface comprising:

(a) a channel mounted on said cabinet and extending transversely of the cabinet;

(b) said channel including a top wall and two spaced side walls extending downwardly from said top wall, said top wall providing a bearing surface;

(c) a rotatable shaft disposed in said channel for rotation about a substantially horizontal axis, said shaft including a cam portion at each end thereof, each of said cam portions being arranged to bear against said top wall;

(d) a roller assembly at each end of said channel, each roller assembly being disposed in line with a corresponding one of said cam portions, each roller assembly including a roller for engaging the supporting surface;

(e) engagement of one of said rollers with the supporting surface causing upward movement of the corresponding roller assembly, urging said roller assembly against the corresponding cam portion at one end of said shaft, thereby urging said cam portion against the bearing surface provided by the top wall of said channel to cause rotation of said shaft; and (f) rotation of said shaft causing rotation of the cam portion at the other end of said shaft to cause downward movement of the corresponding roller assembly to bring the roller thereof into engagement with the supporting surface.

9. The supporting structure of claim 8, wherein:
(a) said shaft comprises a tubular member; and
(b) said cam portions comprise flattened portions of said tubular member at the ends of said shaft, said flattened portions being disposed in planes angularly displaced with respect to each other.

10. The supporting structure of claim 9, wherein said flattened portions are disposed in planes perpendicular to each other.

11. The supporting structure of claim 8, wherein said top wall of said channel is formed to include downwardly extending flanges near the ends thereof, said flanges being positioned adjacent the ends of said shaft to limit axial movement of said shaft.

12. The supporting structure of claim 8, wherein said top wall of said channel includes a plurality of pairs of spaced ears extending downwardly therefrom, said pairs of ears being longitudinally spaced along said channel, the ears of each pair being disposed on opposite sides of said shaft to limit movement of said shaft transversely of said channel.

13. The supporting structure of claim 8, wherein:
(a) each of said roller assemblies includes a top plate for engagement with the corresponding cam portion of said shaft, and a pair of spaced legs extending downwardly from said top plate, said legs being disposed adjacent said side walls;
(b) said side walls including inwardly extending tabs disposed on each side of said legs for guiding each of said roller assemblies for vertical movement relative to said channel; and
(c) each of said roller assemblies including a pair of spaced ears extending downwardly from said top plate in planes perpendicular to the planes of said legs and a roller mounted on said ears.

14. The supporting structure of claim 13, wherein:
(a) said side walls further include second inwardly extending tabs;
(b) each of said legs includes an aperture therein; and
(c) each of said second tabs being received in a corresponding one of said apertures for limiting downward movement of the roller assemblies to retain said roller assemblies in said channel.

* * * * *